Sept. 18, 1956     R. A. BLAKE     2,763,028
MOLDING APPARATUS
Filed June 25, 1951                         2 Sheets-Sheet 1
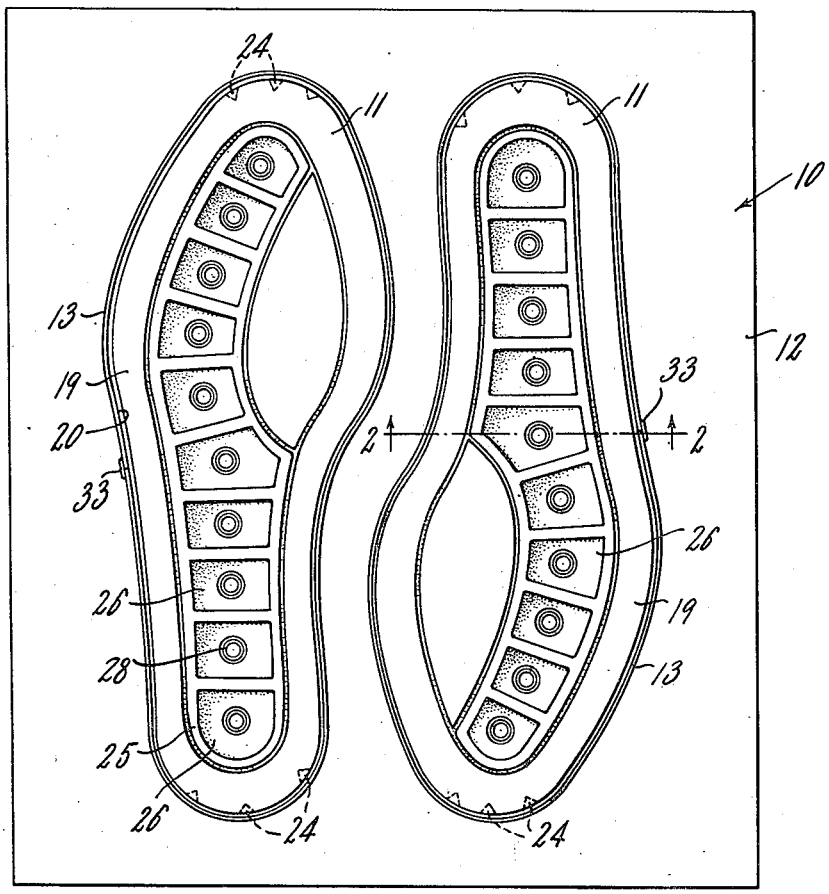
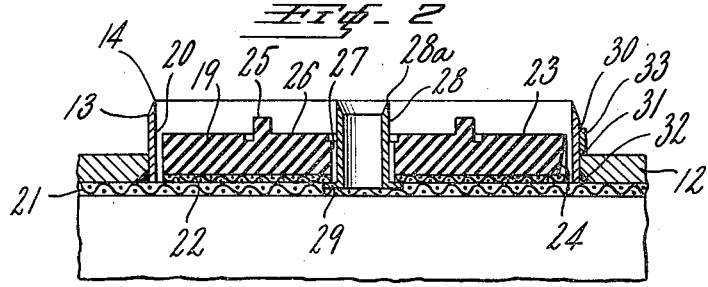
INVENTOR.
RALPH A. BLAKE
BY William H. Epen
ATTORNEY Sept. 18, 1956  R. A. BLAKE  2,763,028
MOLDING APPARATUS
Filed June 25, 1951  2 Sheets-Sheet 2
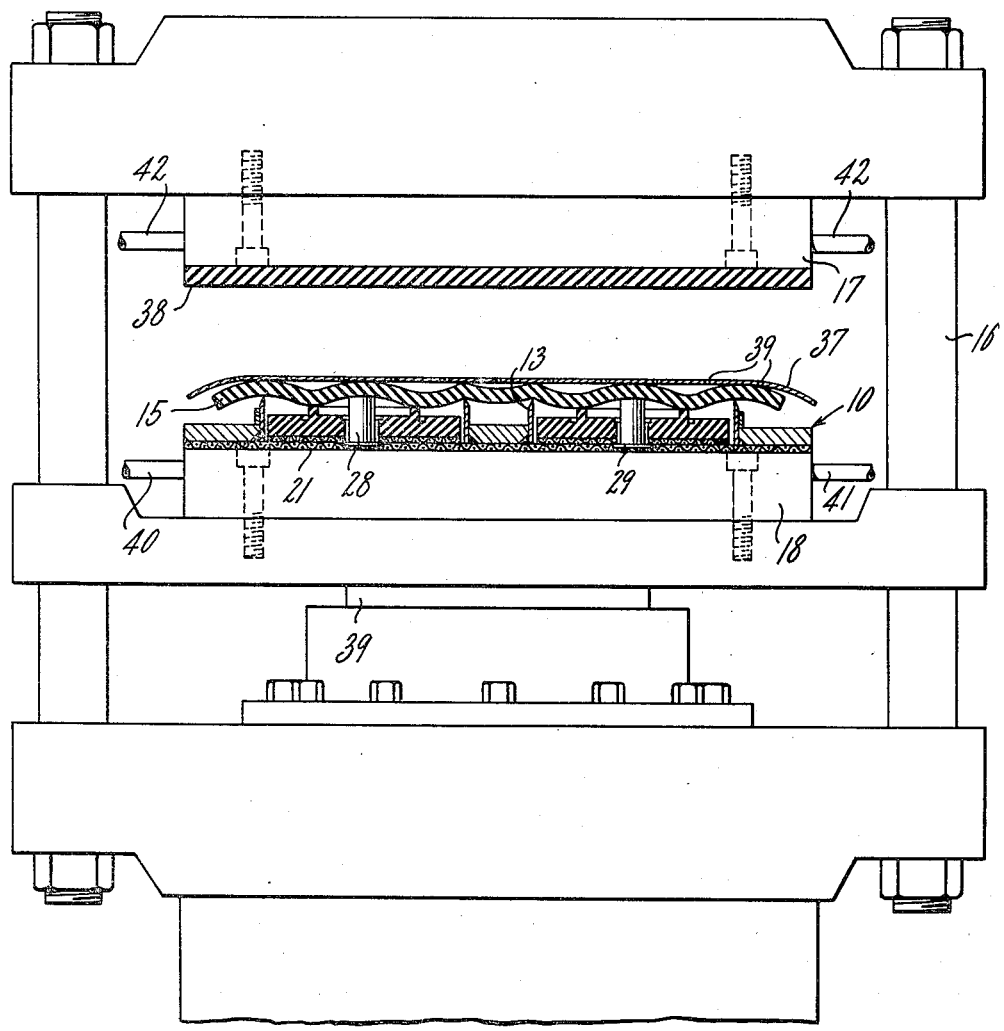
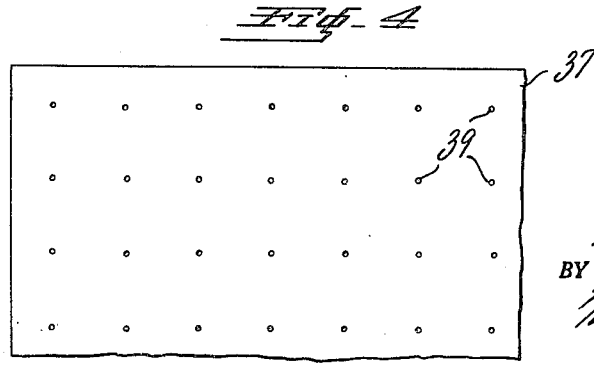
INVENTOR.
RALPH A. BLAKE
BY
*William N. Epes*
ATTORNEY United States Patent Office 2,763,028
Patented Sept. 18, 1956

2,763,028

MOLDING APPARATUS

Ralph A. Blake, Milford, Conn., assignor to United States Rubber Company, New York, N. Y., a corporation of New Jersey Application June 25, 1951, Serial No. 233,359

6 Claims. (Cl. 18—34)

This invention relates to an improved apparatus and method for producing molded articles from moldable slabs, or sheet material, such as plastic unvulcanized calendered rubber. The invention relates particularly to the means for venting trapped air and gases from the mold cavity, and to the means for cutting out the blank from which the molded article is formed.

Heretofore blanks of moldable material have been cut from plastic slabs, or sheets, and placed into a mold cavity in which the blank is subjected to pressure to form the molded article. When the blank is placed in the mold, air is trapped between the bottom of the blank and the bottom of the mold, and where the blank is heated to make it more plastic other gases are exuded from the blank during the molding operation, such air and gases when so trapped in the mold cavity produces blisters, or pock marks in or upon the surface of the molded article. In the case where the bottom of the mold is engraved to form an embossed article, the engraved depressions form cavities into which the air and gases are more readily trapped, and the number of defective articles resulting therefrom is increased.

In accordance with the present invention the bottom of the mold is provided with self closing gas vents which may be placed around the periphery of the bottom of the mold cavity, or wherever required to vent the trapped gases from between the bottom of the moldable blank and the mold bottom. In some cases the vents are placed in depressions that may be formed by an engraved mold bottom. As particularly described herein, the bottom of the mold is made of resilient flowable material, such as soft solid vulcanized rubber. Vents are formed in the bottom of the mold and such vents are closed by the flow of the yieldable mold bottom under the molding pressure after the moldable blank has been placed in the mold cavity, but at the beginning of the application of the pressure and before the plastic blank has been forced into the vents.

The blank is efficiently cut from a sheet of palstic material by an elevated knife edge which encompasses the top rim of the mold. Pressure is applied to the sheet of plastic, which forces it against the knife edge and cuts the blank therefrom. The cut blank is forced into the mold cavity by the continued application of the pressure. As the pressure is applied to the blank in the mold, any trapped air or expelled gases from the blank is forced out of the vents before they are automatically closed by the flow of the flowable mold bottom under the molding pressure. Since the gases can effectively escape from the mold cavity, blisters and pock marks are substantially prevented from being formed on the molded article. Furthermore, the effective seal formed by the knife edge at the top rim of the mold, and by the automatic closure of the gas vents substantially prevents the formation of flash on the molded article.

The moldable blank is cut from a pre-heated plastic sheet to increase its plasticity, and the blank is cooled during the application of the molding pressure. Due to the practice of this method and the use of an embossed mold bottom having special properties, a sharp design is imparted to the molded article.

Therefore, an object of this invention is to provide a mold and a process that will simultaneously cut out a moldable blank from a sheet of plastic material and produce a sharply molded article from the blank, wherein the mold is provided with novel means for venting the gases therefrom.

Another object is to provide a mold and a process capable of producing embossed articles free of flash, and which will require no further treatment to impart a surface design or external configuration thereto.

This invention will be further described in reference to the accompanying drawings; in which—

Fig. 1 is a plan view of the open upturned face of a mold embodying the present invention, and containing two cavities for making shoe soles;

Fig. 2 is an enlarged view of a cross-section through one of the mold cavities shown in Fig. 1, and taken on line 2—2 thereof;

Fig. 3 is an elevational view of a molding apparatus embodying this invention, comprising a press having a mold shown in cross-section therein, and illustrating the method of loading the mold cavities, and applying the pressure to the plastic blanks and cooling them after they are cut from the plastic sheet;

Fig. 4 is a plan view of a portion of a sheet of non-adhesive material used in the molding operation; and Fig. 5 is a cross-sectional view of a mold cavity, containing a modified form of vent.

This invention is suitable for producing molded parts from thermoplastic resin materials as well as from vulcanizable rubber stocks. For the purpose of illustrating the invention, it is described in reference to the manufacture of molded shoe outsoles from a vulcanizable rubber composition, but it will be understood that other articles as well as shoe outsoles may be made from other moldable materials.

Referring to Figs. 1 and 2 of the drawings, a mold 10 having two cavities 11 for molding shoe soles is shown in Fig. 1, and a cross-section through one of the cavities on line 2—2 of Fig. 1 is shown on an enlarged scale in Fig. 2. The cavities 11 are formed in or on a base plate 12, and as each are alike, only one will be described in detail. A cutting die 13 extends around the periphery of the mold cavity 11 and forms the side walls thereof. The die 13 is provided with a knife edge 14 on its upper brim, which is adapted to cut moldable sole blanks, from a sheet 15 of vulcanizable rubber stock as will be described in reference to the pressure applying, blank cutting, and molding press 16 shown in Fig. 3.

The knife edge 14 pojects above the base plate 12 to a height greater than the depth of the mold cavity 11, so that when the sheet 15 is placed over the cutting die 13 and pressed against the knife edge 14 by the stationary head 17 and the vertically moveable head 18 of the press 16, the sole blank will be cut out and forced into the mold cavity 11, without applying pressure to the scrap on the outside of the cutting die 13.

In the operation of loading the mold cavity with the moldable blank, air is trapped between the bottom of the moldable sole blank and the bottom 19 of the mold cavity. As shown particularly in Fig. 2, a peripheral gas vent 20 extends around the bottom 19 of the cavity 11 to permit the escape of the air to the outside atmosphere. The vent 20 communicates with a layer of porous heavy fabric 21, which is placed underneath and preferably cemented to the base plate 12. The trapped air escapes from the vent 20 through the fabric 21 between the plate 12 and the lower press platen 18 to the outer atmosphere. For the purpose of preventing the moldable blank from being forced into the venting space 20 under the molding pressure, the bottom 19 of the mold cavity is made of a layer of resilient flowable material, such as vulcanized rubber, and when the molding pressure is applied to the moldable sole blank, the flowable bottom 19 spreads laterally and closes off the space 20 before the molding pressure has risen to the extent required to force the moldable sole blank into such space.

The under surface of the resilient rubber mold bottom 19 is reinforced with a layer of fabric 22 adhesively bonded thereto for the purpose of restraining such surface from spreading laterally under the molding pressure, while the top surface 23 is permitted to freely flow laterally and close the vent 20. However, after the mold bottom 19 has been used for some time, its area becomes enlarged permanently, and it may be necessary to grind off its periphery to maintain the peripheral vent 20 between the cutting die 13 and the mold bottom 19, which may be done readily as the bottom 19 is removable from the mold cavity 11. It has been found that the width of the vent 20 as measured between the die 13 and the mold bottom 19 should be approximately 0.10 to 0.035 inch, depending upon the size and material of bottom 19. To further assist in venting the air around the periphery of the mold bottom 19, its outer periphery is provided with notches 24, which taper towards the top surface 23 of the mold bottom and feather out at such top surface.

For the purpose of producing an embossed surface on the bottom of the shoe sole, the top surface 23 of the mold bottom 19 is provided with a suitable embossed design and forms an embossing die, which has elevations 25 and depressions 26 surrounded by such elevations. An internal gas vent is provided in each of the depressions 26 to permit the escape of gas therefrom. As shown in Fig. 2, the vent 27 is formed between a circular hole cutting die 28 and the wall of an aperture formed in the mold bottom 19 for the reception of the die. A supporting flange 29 is formed on the lower end of the die 28, and the trapped air in the depression 26 escapes through the fabric 22 to the porous fabric 21 over the top of the flange 28. Alternatively notches (not shown) may be provided in the flange 28 to permit the gas to escape directly to the fabric 21. The internal vents 27 in the depressions 26 may be eliminated, provided the depressions communicate with each other, as by forming notches (not shown) in the enclosing ridges 25. The die 28 is provided with a knife edge rim 28a similar to the knife edge 14 on the peripheral cutting die 13. As the sole blank is forced into the mold cavity 11, the circular die 28 cuts out a round rubber plug in the molded sole. The hole produced in the sole by the removal of the plug may be allowed to remain to provide the tread surface of the sole with better anti-slipping qualities, or the hole may be plugged, or filled with a rubber plug of the same size, but of another color for the purpose of producing an attractive color design in the sole.

The base plate 12 may be made of aluminum and the peripheral cutting die 13 may be made from a thin steel strip of metal 30. The strip 30 is secured in an opening 31 of the shape of the shoe sole in the base plate 12 by a weld, or soldered joint 32, at the base of the upright strip 30. The strip 30 is placed around the periphery of the opening 31, and its ends are joined by welding, or soldering a short strap 33 of metal to the abutting ends of the strip.

The bottom 19 of the mold cavity is made separately from the remainder of the cavity by molding it in an engraved metal mold (not shown) from a rubber composition, preferably an isobutylene-isoprene copolymer rubber known as butyl or GR–I, which is compounded to produce a hardness of from 45 to 100 as measured on the Shore "A" Durometer when vulcanized in a full compression mold. Although butyl rubber is preferred, the bottom of the mold may be made from natural rubber, Buna S (GR–S), neoprene or other vulcanizable rubber. Butyl is preferred because of its superior heat resistance and because it produces an especially sharp imprint in the molded article. A satisfactory formula for the butyl rubber compound from which the mold bottom may be made is as follows:

| Components: | Parts by weight |
| --- | --- |
| Butyl (GR–I 15) (97.5 isobutylene, 2.5 isoprene) | 100.0 |
| Furnace black | 75.0 |
| Stearic acid | 2.8 |
| Zinc oxide | 5.0 |
| Tetramethyl thiuram disulfide | 1.0 |
| Selenium diethyl dithiocarbamate | 1.0 |
| Sulfur | 3.0 |

The above compound is mixed in a Banbury mixer, or on a mill, and calendered in accordance with conventional rubber practice. A rubber biscuit, having the shape of the mold bottom 19 is cut from the calendered sheet stock laminated to about ½ inch in thickness, is placed in a compression mold having a cavity of like shape. If an embossed mold bottom 19 is to be made, the cavity is provided with one engraved and one plain face. The compression mold is placed in a platen press to apply pressure to the butyl rubber compound therein and vulcanize it into the shape of the mold bottom 19. This particular compound has a hardness of about 75 Shore "A" Durometer. The layer of fabric 22 to be bonded to the bottom 19 is placed in the mold adjacent to its plain face. The fabric is preferably treated with rubber cement or skim-coating and such treated side is placed adjacent to the raw rubber biscuit to insure good adhesion thereto. Such reinforcing fabric 22 imparts longer life to the bottom 19 and prevents excessive distortion.

A modified form of mold is illustrated in Fig. 5, which discloses a mold bottom 34 having a plain upper face, and provided with a modified form of vent 35 having converging sides, in which the small end of the vent pierces the upper surface of the mold bottom 34. Such vents may be conical in shape, or in the form of slits, in which the cross-section will be substantially as shown in Fig. 5. When pressure is applied to the resilient flowable bottom 34, the upper ends of the vents 35 will be closed by the lateral flow of the rubber material in the bottom 34. Otherwise the construction of the mold in Fig. 5 is the same as that shown in Fig. 2.

In the operation of making molded shoe soles in the mold 10, the sheet of rubber stock from which the shoes are to be molded is heated to render it more plastic. It has been found that for standard sole compounds, such stock should be heated for five minutes at 170°. The mold 10 is placed on the movable platen 18 of the press 16 as shown in Fig. 3. The heated sheet stock 15 is placed over the mold cavities 11, and a stripping sheet 37 formed of perforated sheet material having an anti-adhesive glossy surface is placed on top of the sheet stock 15 to prevent it from sticking to a soft solid yieldable rubber pad 38 which is adhered to the bottom of the upper platen 17 of the press. The bottom platen 18 is then raised by admitting pressure against the hydraulic piston 39 to force the glossed anti-adhesive sheet 37 against the rubber pad 38, and force the rubber sheet stock 15 against the cutting die 13. The moldable sole blanks are thus cut from the stock 15 and forced into the cavity 11 by the yielding rubber pad 38. It will be noted that air will be trapped in the mold cavity 11 between the sole blank and the bottom 19 of the mold. Such air is caused to escape through the vents, such as indicated at 20, 27 (Fig. 2) and 35 (Fig. 5) as the blank is being forced towards the bottom 19, of the mold cavity. The air is forced out of the cavity before sufficient molding pressure is applied to the sole blank between the platens 17 and 18 to close the vents formed in the mold bottom. Such vents however, are closed before the pressure rises sufficiently to force the plastic sole blank into the vents.

The perforations 39 are provided in the anti-adhesive sheet 37 sufficiently close together to prevent air from being trapped between the sheet and the plastic rubber sheet stock 15, and thereby prevent pock marks or blisters from being formed on or in the surface of the molded shoe sole. One perforation 39 per square inch has been found to be sufficient. The perforations also facilitate in the stripping of the anti-adhesive sheet 37 from the rubber stock 15 after the shoe soles are molded. Such anti-adhesive sheet material may be made of cellophane, or Holland cloth, or other resin treated textile fabric, such as oil cloth.

In order to prevent the molded shoe soles from sticking to the mold cavity, the mold 10 and the sheet stock 15 are cooled by circulating cooling water through the press platens 17 and 18. Such cooling is also effective in preventing the formation of pock marks on the surface of the molded sole. The cooling water may be circulated in coils (not shown) in the platen 18 by forcing it into the inlet 40 to the coils and out of the outlet 41 therefrom. The platen 17 is cooled by circulating water therethrough from the inlet 42 and out of the outlet 43 as described in reference to the lower platen 18.

When the hot rubber plastic stock 15 strikes the cold mold 10, it stiffens up so that the cut and embossed part may be removed almost immediately without danger of losing the impression formed by the bottom 19. It has been found that good impressions can be made by allowing the molding pressure to be applied for about 10 seconds. After which the press 16 is opened, and the mold is removed therefrom. The anti-adhesive sheet 37 is then stripped from the stock 15, the scrap is removed from the outer perimeter of the cutting dies 13, and the molded soles are removed from the cavities 11. Where the hole cutting die 28 is used, the round plug of rubber cut out of the stock sheet 15 usually adheres to and is removed with the anti-adhesive sheet 37. After the molded sole is removed from the cavity 11, a plug of a different type of rubber may be inserted to replace the removed plug.

After the molded soles are removed from the mold cavities, they are still unvulcanized. Where the soles are used on boots, shoes or overshoes that are to be vulcanized, they are built into the footwear and vulcanized simultaneously therewith. However, if the footwear is of a type requiring the vulcanization of the soles before application to the shoes, the soles may be cured in an open oven, and subsequently sewed, cemented or otherwise attached to the shoe.

While this invention has been described particularly in reference to the manufacture of shoe soles from vulcanizable rubber compounds, it will be understood that the invention is applicable to the manufacture of molded articles from thermoplastic resins, for example, cellulose acetate, polyvinyl chloride, etc. Where the latter materials are used, it may be necessary to leave the molded articles for a longer period of time in the mold cavity under the molding pressure to insure adequate cooling, because some thermoplastic materials must be heated to a higher temperature than some unvulcanized thermosetting rubber compounds to soften them, and they therefore require a longer cooling period to insure the solidification of the material required to maintain the sharp impression formed in the mold cavity.

It will be understood that other changes in the details of this invention may be made without departing from the spirit of the invention and the scope of the claims.

Having thus described my invention, what I claim and desire to protect by Letters Patent is:

1. A mold comprising side and bottom walls for defining a cavity for molding plastic material therein, said cavity having an opening defined by the top rim of said side walls for the reception of a charge of said material in close fitting contact with said side walls, said bottom wall of said cavity having a vent therein removed from said opening, said vent being adapted to discharge substantially all of the gas from said cavity to the outside atmosphere before said charge reaches said vent, said bottom wall comprising resilient flowable material adapted to close said vent upon the transmission of molding pressure from said charge to said resilent flowable material.

2. A mold having a cavity therein for molding embossed articles from plastic material, said cavity having an embossed bottom of resilient flowable material, said bottom having a vent therein for gas extending from said cavity to the outside atmosphere, said vent including a gas pervious support for said bottom through which gas may pass from said cavity, and a closure for said vent formed by said flowable material when molding pressure is applied thereto.

3. A mold having a plurality of cavities therein for molding articles of plastic from plastic sheet material under pressure, a top cover having a plane surface for closing all of said cavities, each of said cavities being defined by side and bottom walls, said side walls of each said cavity having an upper peripheral cutting edge extending substantially above all other elements underneath said plane surface of said top cover, whereby charges of a plastic material for each cavity may be cut from the sheet material by the pressure of said plane surface of said mold top and molded under the pressure of said top without applying pressure to the scrap sheet material falling on the outside of said cavities, said bottom wall of each said cavity having a vent therein removed from said cavity cutting edge, said vent being adapted to discharge substantially all the gas from said cavity with which it is associated to the outside atmosphere before said charge reaches said vent, and said bottom wall of each cavity comprising resilient flowable material adapted to close said vent upon the transmission of molding pressure from said charge to said flowable material.

4. A mold comprising a rigid base plate having a through opening therein, a cutting die secured in said opening and forming the side wall of the mold cavity, said die having a cutting edge which extends above said base plate a greater distance than the depth of said mold cavity, an embossing die of resilient flowable material enclosed in said cutting die and forming the bottom of the mold cavity, said embossing die being reinforced on its bottom surface with a layer of textile fabric and the periphery of said embossing die being slightly spaced from said cutting die to provide a vent in the bottom of the mold cavity, a closure for said vent being formed by the periphery of said embossing die making contact with said cutting die under molding pressure, and a layer of air pervious material in contact with said base plate for venting air from said mold cavity.

5. A molding apparatus comprising the combination of a mold and a press for forcing heat softened plastic material into said mold comprising a base plate, a cutting die affixed to said plate and extending above said plate, an embossing die of resilient flowable material enclosed in said cutting die and forming the bottom of the mold cavity, said bottom of the mold cavity having a vent extending through said base plate between said embossing die and said cutting die, said press having a lower mold supporting platen and an upper platen between which said mold is adapted to be clamped, a layer of air pervious material interposed between said base plate and said supporting platen and in direct contact with the bottom surface of said base plate, a resilient pad and a perforated stripping sheet interposed between said upper platen and said mold, said resilent pad and stripping sheet being placed adjacent to each other, and said stripping sheet being adapted to make direct contact with the top of the plastic material when forced into said mold cavity and to be stripped from said plastic material after the molding operation, and means for cooling said upper and lower platens.

6. A mold having a cavity therein enclosed in part by rigid side walls and a bottom of resilient flowable material which is slightly separated from said side walls to form a venting space therebetween, a supporting plate for said side walls and bottom, an air pervious layer of fabric interposed between said plate and said side walls and bottom of said mold to permit the escape of gas from said venting space to the outside atmosphere, and said bottom being adapted to flow under molding pressure and close said venting space between it and said side walls.

References Cited in the file of this patent

UNITED STATES PATENTS

| | | |
|---|---|---|
| 951,497 | Wilcox | Mar. 8, 1910 |
| 1,209,358 | Terkelsen | Dec. 19, 1916 |
| 1,482,185 | Egerton | Jan. 29, 1924 |
| 1,628,257 | Mallory | May 10, 1927 |
| 1,673,505 | Haase | June 12, 1928 |
| 2,120,328 | Ferngren | June 14, 1938 |
| 2,203,543 | Pancorbo | June 4, 1940 |
| 2,230,189 | Ferngren | Jan. 28, 1941 |
| 2,582,922 | Crowley et al. | Jan. 15, 1952 |